United States Patent
Wang et al.

(10) Patent No.: US 12,523,981 B2
(45) Date of Patent: Jan. 13, 2026

(54) METHOD FOR DETECTING WORKPIECE BASED ON HOMOGENEOUS MULTI-CORE ARCHITECTURE AND EDGE COMPUTING DEVICE

(71) Applicant: HON HAI PRECISION INDUSTRY CO., LTD., New Taipei (TW)

(72) Inventors: Cheng-Feng Wang, Kaohsiung (TW); Li-Che Lin, Kaohsiung (TW); Yen-Yi Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 453 days.

(21) Appl. No.: 18/114,111

(22) Filed: Feb. 24, 2023

(65) Prior Publication Data

US 2024/0142935 A1 May 2, 2024

(30) Foreign Application Priority Data

Nov. 2, 2022 (CN) .......................... 202211361808.3

(51) Int. Cl.
G05B 19/402 (2006.01)

(52) U.S. Cl.
CPC .. G05B 19/402 (2013.01); *G05B 2219/39483* (2013.01)

(58) Field of Classification Search
CPC ........ G05B 19/402; G05B 2219/39483; G06T 2207/30164; G06T 7/73; G06V 10/242; G06V 10/25; G06V 10/422; G06V 10/761; G06V 10/94; G06V 20/25; G06V 2201/06
See application file for complete search history.

(56) References Cited

U.S. PATENT DOCUMENTS

| | | | | |
|---|---|---|---|---|
| 5,982,492 A | * | 11/1999 | Oppenheimer | G01B 11/26 356/614 |
| 2010/0185412 A1 | * | 7/2010 | Abe | G01B 7/30 33/1 N |
| 2013/0155397 A1 | * | 6/2013 | Kumagai | G01D 5/3473 356/138 |
| 2017/0343381 A1 | * | 11/2017 | Yamashita | G01D 5/145 |
| 2020/0356067 A1 | * | 11/2020 | Bretschneider | B23B 1/00 |

FOREIGN PATENT DOCUMENTS

| | | |
|---|---|---|
| CN | 112712513 | 4/2021 |
| CN | 114081635 | 4/2022 |
| JP | S62183290 A * | 8/1987 |

* cited by examiner

*Primary Examiner* — Kidest Worku
(74) *Attorney, Agent, or Firm* — ScienBiziP, P.C.

(57) ABSTRACT

A method for detecting workpiece based on homogeneous multi-core architecture is illustrate. The method comprises: obtaining detecting images of detecting workpieces; identifying detecting areas of the detecting workpieces in the detecting images; dividing the preset rotation angle to obtain the rotation accuracy and initial rotation angles; based on each of the initial rotation angles, rotating the detecting areas to obtain a rotation area of each of the initial rotation angles; calculating similarity values between each of the rotation areas and a preset qualified area, and determining a largest similarity value as the target similarity value; and when the rotation accuracy is greater than or equal to a preset accuracy, identifying whether the detecting workpiece is a qualified workpiece according to the target similarity value and a preset similarity threshold.

20 Claims, 4 Drawing Sheets

METHOD FOR DETECTING WORKPIECE BASED ON HOMOGENEOUS MULTI-CORE ARCHITECTURE AND EDGE COMPUTING DEVICE

This application claims priority to Chinese Patent Application No. 202211361808.3 filed on Nov. 2, 2022, in China National Intellectual Property Administration, the contents of which are incorporated by reference herein.

FIELD

The subject matter herein generally relates to a field of machine vision, in particular, relates to a method for detecting workpiece based on homogeneous multi-core architecture and an edge computing device.

BACKGROUND

In current workpiece detection scheme, a machine vision industrial computer is usually used for detection of workpieces. Due to a slow operation speed of the machine vision industrial computer, a detection speed of the workpieces is not high.

BRIEF DESCRIPTION OF THE DRAWINGS

Implementations of the present disclosure will now be described, by way of embodiment, with reference to the attached figures.

DETAILED DESCRIPTION

Figure 1:
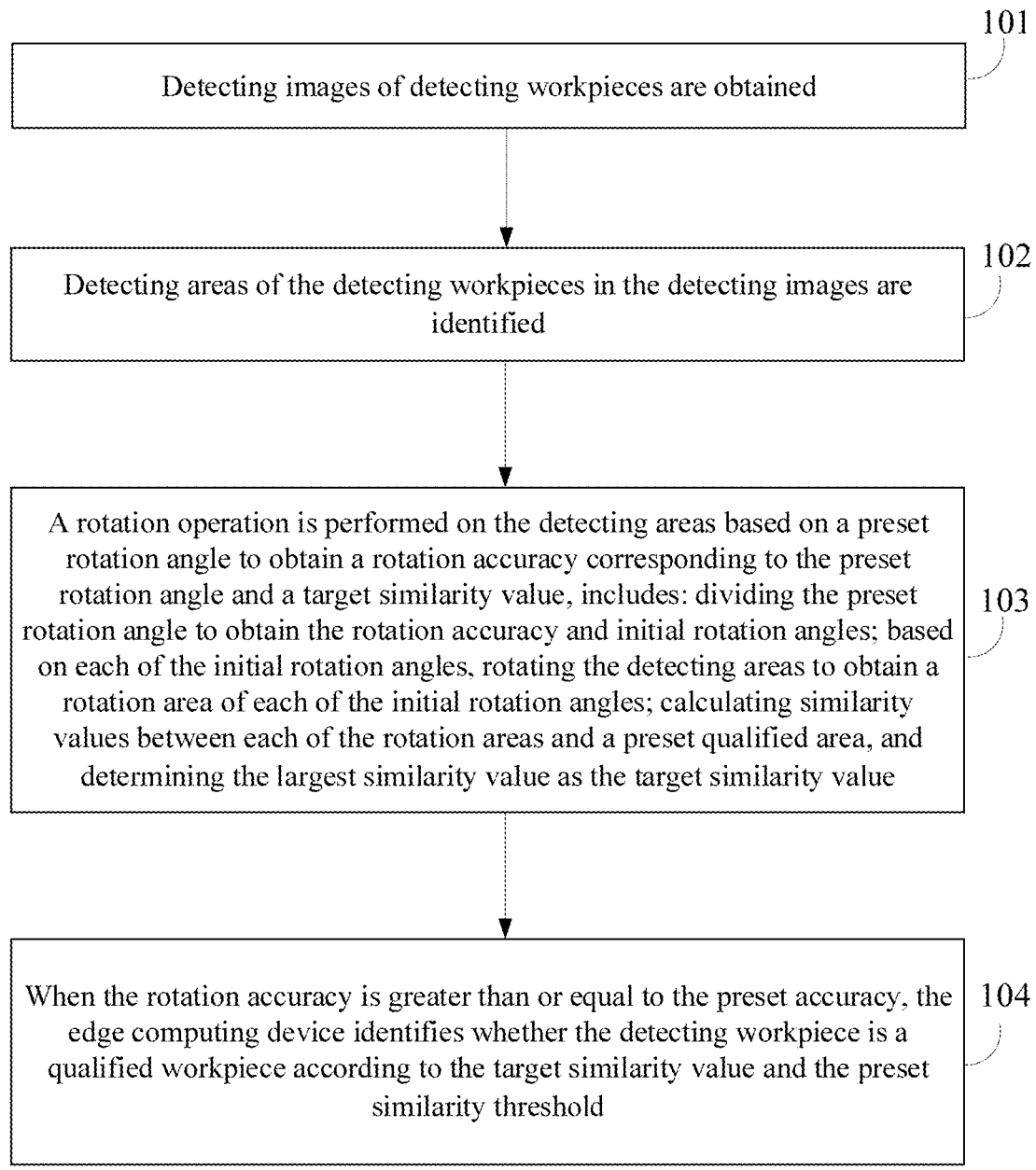
FIG. 1 is a flowchart of one embodiment of a method for detecting workpiece based on homogeneous multi-core architecture.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one".

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

In one embodiment, a method for detecting workpiece based on homogeneous multi-core architecture can be applied in one or more edge computing devices 1. In one embodiment, the edge computing device 1 is a device that can automatically perform calculation of parameter value and/or information processing according to pre-set or stored instructions. In one embodiment, hardware of the electronic device 1 includes, but is not limited to a microprocessor, an Application Specific Integrated Circuit(ASIC), a Field-Programmable Gate Array (FPGA), a Digital Signal Processor (DSP), or an embedded device, etc.

In one embodiment, the edge computing device 1 can be any electronic product that can interact with a user, such as a personal computer, a tablet computer, a smart phone, a Personal Digital Assistant (PDA), a game console, and an Internet Protocol Television (IPTV), a smart wearable device, etc.

In one embodiment, the edge computing device 1 may also include a network equipment and/or a user equipment. In one embodiment, the network device includes, but is not limited to, a single network server, a server group consisting of multiple network servers, or a cloud computing-based cloud consisting of a large number of hosts or network servers.

In one embodiment, a network connected to the edge computing device 1 includes, but is not limited to, the Internet, a wide area network, a metropolitan area network, a local area network, and a Virtual Private Network (VPN).

FIG. 1 illustrates the method for detecting workpiece based on homogeneous multi-core architecture. The method is provided by way of example, as there are a variety of ways to carry out the method. Each block shown in FIG. 1 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 101.

At block 101, detecting images of detecting workpieces are obtained.

In one embodiment, the detecting workpieces can be any component or part of electronic device, such as computers, smart phones.

In one embodiment, the edge computing device controls a photographing device to photograph the detecting workpieces to obtain the detecting images.

In one embodiment, the photographing device is a device with a shooting and video recording function, and the photographing device may be a fixed shooting device or a device linked with a clamping device. For example, the photographing device may be a camera or a video camera, etc.

In one embodiment, traditional machine vision industrial personal computers (IPC) are replaced by the edge computing device to detect the detecting workpieces. As the cost of the edge computing device is lower than the machine vision industrial computer, it can reduce the cost of detection for workpieces.

At block 102, detecting areas of the detecting workpieces in the detecting images are identified.

In one embodiment, the edge computing device identifies the detecting areas of the detecting workpieces in the detecting images. In one embodiment, the edge computing device determines pixel points with greater pixel values than a preset threshold in the detecting images as target pixel points, and determines image areas formed by the target pixel points as feature areas, and determines the detecting areas from the feature areas based on a qualified area.

In one embodiment, before identifying the detecting areas of the detecting workpieces in the detecting images, the edge computing device performs a preprocessing operation on the detecting images. In one embodiment, the preprocessing operation includes binarization operation and equalization operation. The preset threshold can be set in advance.

In one embodiment, the qualified area is an image area of a qualified workpiece in a corresponding qualified image, and a generation method of the qualified area is basically the same as that of the detecting areas.

In one embodiment, the qualified workpiece is a qualified component or part with the same category as the detecting workpiece.

In one embodiment, the edge computing device determining the detecting areas from the feature areas based on the qualified area includes: the edge computing device identifies feature shape of the feature areas, and calculates the feature acreage of the characteristic area; the edge computing device calculates shape error between the feature shape and a qualified shape of the qualified area, and calculates an acreage area error between the feature area and the qualified acreage of the qualified area; the edge computing device determines the feature areas having the shape error within a first preset error range and having the acreage error within a second preset error range as the detecting areas.

In one embodiment, the first preset error range can be set in advance, for example, the first preset range area can be [0.1, 0.2]. In one embodiment, the second preset error range can be set in advance, for example, the second preset range area can be [0, 0.1].

In one embodiment, the edge computing device identifying the feature shape of the feature areas includes: the edge computing device uses an edge detection algorithm to detect edge pixel points of the detecting areas; further, the edge calculation device determines a contour formed by the edge pixel points as the feature shape.

In one embodiment, the edge detection algorithm can be a canny algorithm.

In one embodiment, by determining the feature areas of the shape error within the first preset error range and of the acreage error within the second preset error range as the detecting area, it can ensure that the detecting image is an image area containing the detecting workpiece.

At block 103, a rotation operation is performed on the detecting areas based on a preset rotation angle to obtain a rotation accuracy corresponding to the preset rotation angle and a target similarity value.

In one embodiment, performing the rotation operation on the detecting areas based on a preset rotation angle to obtain a rotation accuracy corresponding to the preset rotation angle and the target similarity value, includes: dividing the preset rotation angle to obtain the rotation accuracy and initial rotation angles; based on each of the initial rotation angles, rotating the detecting areas to obtain a rotation area of each of the initial rotation angles; calculating similarity values between each of the rotation areas and a preset qualified area, and determining the largest similarity value as the target similarity value.

In one embodiment, the edge computing device determines a ratio of the preset rotation angle to a preset value as the rotation accuracy. In one embodiment, a first initial rotation angle is a sum of the preset initial angle and the rotation accuracy, and any initial rotation angle other than the first initial rotation angle is a sum of a previous initial rotation angle and the rotation accuracy. In one embodiment, the preset initial angle and the preset value can be set in advance, for example the preset rotation angle is set as 360 degrees.

In one embodiment, the preset value is a quantity of cores, a quantity of the initial rotation angles is a multiple of the quantity of the cores.

For example, if the preset initial angle is 0 degree, the preset rotation angle is 360 degrees, the preset value is 9, and the ratio between the preset rotation angle of 360 degrees and the preset value of 9 is 40, then the rotation accuracy is 40 degrees angle, and the initial rotation angles are 40 degrees, 80 degrees, 120 degrees, 160 degrees, 200 degrees, 240 degrees, 280 degrees, 320 degrees and 360 degrees in turn.

In one embodiment, the edge computing device rotating the detecting areas to obtain the rotation area of each of the initial rotation angles includes: the edge computing device constructs threads according to the quantity of the cores of multi-core processor of the edge computing device and the quantity of idle threads, and determines constructed threads and the idle threads as device threads; the edge computing device generates rotation tasks of the detecting areas according to each of the initial rotation angles and preset instructions, and loads the rotation tasks into a task queue; further, the edge computing device dynamically allocates the rotation tasks in the task queue based on the quantity of the device threads, the quantity of the rotation tasks, and status of the device threads to obtain the rotation tasks of each of the device threads; further, the edge computing device calls each of the device threads to process corresponding rotation task to obtain the rotation area.

In one embodiment, the preset instruction is an instruction configured to rotate the detecting area, and the preset instruction can be set in advance. The quantity of the cores is the quantity of cores of a central processing unit of the edge computing device. In one embodiment, the state of the device threads includes a working state and an idle state.

In one embodiment, the edge computing device calculates a quantity difference between the quantity of the cores and the quantity of the idle threads in the edge computing device, and constructs new threads, and obtains the device threads, and the quantity of the new thread has a same value of the quantity difference. In one embodiment, the quantity of the device threads is the same as the quantity of the cores, and each of the device threads corresponds to one core.

In one embodiment, the edge computing device includes a multi-core central processing unit, each core of the multi-core central processing unit is not a real physical computing core, but a logical core simulated based on idle execution units in a traditional central processing unit by using multi-threading technology, for example, the multi-threading technology may be a Hyper-Threading (HT) technology. In one embodiment, the traditional central processing unit is a central processing unit with weak computing power, for example, the traditional central processing unit may be a central processing unit of a complex instruction set computer (CISC). Multiple logic cores can be simulated by using the multi-thread technology, so that the central processing unit with the weak computing power can perform workpiece detection, thereby improving the applicability of the central processing unit. In one embodiment, all cores of the multi-core central processing unit have the same architecture, and in each unit time, the multi-core central processing unit can call multiple threads to process the rotation tasks, so a generation speed of the rotation area and the target similarity value can be improved.

In one embodiment, the edge computing device dynamically allocating the rotation tasks in the task queue based on the quantity of the device threads, the quantity of the rotation tasks, and status of the device threads to obtain the rotation tasks of each of the device threads, includes: the edge computing device assigns each of the rotation tasks to one device thread when the quantity of the rotation tasks is less than or equal to the quantity of the device threads; or, when the quantity of the rotation tasks is greater than the quantity of the device threads, the edge computing device assigns one rotation task to each of the device threads according to a sequence of the rotation tasks in the task queue, and continues to assign a next rotation task when one device thread finishes executing current rotation task, until the rotation tasks in the task queue are all assigned.

In one embodiment, if the quantity of the rotation tasks is less than or equal to the quantity of the device threads, the edge computing device assigns each of the rotation tasks to one device thread according to the sequence of the rotation tasks in the task queue, or the edge computing device randomly assigns each of the rotation tasks to one device thread.

By the above embodiment, one detecting area is rotated based on each of the initial rotation angles to obtain one rotation area, and the initial rotation angle of the rotation area, which is most similar to the qualified area, can be determined.

In one embodiment, the similarity value of each of the rotation areas to the preset qualified area is calculated according to formulas:

$$SSIM(x, y) = \frac{(2\mu_x\mu_y + c_1)(2\sigma_{xy} + c_2)}{(\mu_x^2 + \mu_x^2 + c_1)(\sigma_x^2 + \sigma_y^2 + c_2)},$$

$$c_1 = (K_1L)^2,$$

$$c_2 = (K_2L)^2.$$

Where, SSIM(x, y) is the similarity value, X is the rotation area, y is the qualified area, $\mu_x$ is a gray average of the rotation area, $\mu_y$ is a gray average of the qualified area, $\sigma_x$ is a gray standard deviation of the rotated area, $\sigma_y$ is a gray standard deviation of the qualified area, $\sigma_{xy}$ is a gray covariance between the rotated area and the qualified area, $c_1$ and $c_2$ are parameters to maintain a non-zero denominator parameter in the similarity value, L is the maximum pixel value of the pixel point in the qualified area, $K_1$ and $K_2$ are preset constants, and $K_1 \ll 1$, $K_2 \ll 1$.

In one embodiment, the similarity value is calculated by using hardware acceleration algorithms such as Single Instruction Multiple Data (SIMD) or General-purpose computing on graphics processing units (GPGPU). In one embodiment, one instruction in the SIMD algorithm can process multiple pieces of data.

Figure 2:
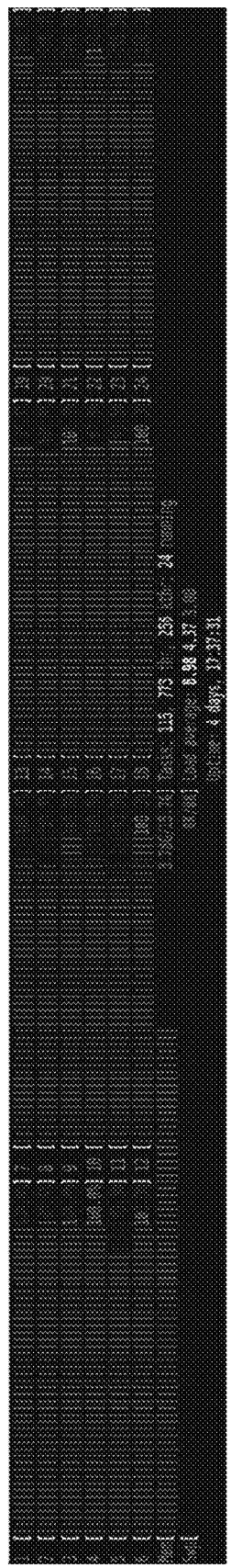
FIG. 2 is a schematic diagram of one embodiment of a utilization of multiple logical cores of an edge computing device.

FIG. 2 illustrates a utilization of the logical cores of the edge computing device. In FIG. 2, a central processor of the edge computing device has a total of 24 logical cores. FIG. 2 shows the utilization rate of the 24 logical cores. Among the 24 logical cores, the utilization rate of 8 logical cores can reach 100%, and the utilization of 16 logical cores is close to 100%. The utilization rate of the logic cores reaching or close to 100% indicates that all the logic cores in the edge computing device can be effectively utilized, and the computing performance of the edge computing device is fully utilized, therefore the generation speed of the rotation area and the target similarity value can be improved.

By the above embodiment, the largest similarity value is determined as the target similarity value, and the target similarity value can represent the maximum similarity between the detecting area and the qualified area, therefore, through the target similarity value, the detecting workpiece is accurately identified as a qualified workpiece.

At block 104, when the rotation accuracy is greater than or equal to the preset accuracy, the edge computing device identifies whether the detecting workpiece is a qualified workpiece according to the target similarity value and the preset similarity threshold.

In one embodiment, the preset accuracy can be set in advance. For example, the preset accuracy can be set as 0.5 degree angle or 1 degree angle.

In one embodiment, the edge computing device identifies whether the detecting workpiece is a qualified workpiece according to the target similarity value and the preset similarity threshold includes: the edge computing device compares the target similarity value with the preset similarity threshold, and when the target similarity value is greater than or equal to the preset similarity threshold, the edge computing device determines that the detecting workpiece is the qualified workpiece; or when the target similarity value is less than the preset similarity threshold, the edge computing device determines that the detecting workpiece is an unqualified workpiece.

In one embodiment, the preset similarity threshold can be set in advance, which is not limited in present disclosure. For example, the preset similarity threshold may include, but not limited to 0.8, 0.85 and 0.9.

In one embodiment, when the rotation accuracy reaches the preset accuracy, the detecting workpiece having the target similarity value greater than the preset similarity threshold is directly determined as the qualified workpiece, so that the qualified workpiece can be quickly identified.

In one embodiment, when the rotation accuracy is less than the preset accuracy, the method further includes: the edge computing device generates the target rotation angle according to the initial rotation angle corresponding to the target similarity value and the rotation accuracy, and further, the edge computing device repeatedly rotates the detecting areas based on the target rotation angle, until the rotation accuracy is greater than or equal to the preset accuracy.

In one embodiment, the edge computing device generating the target rotation angle according to the initial rotation angle corresponding to the target similarity value and the rotation accuracy, includes: the edge computing device calculates an angle difference between the initial rotation angle corresponding to the target similarity value and the rotation accuracy, and calculates an angle sum of the initial rotation angle corresponding to the target similarity value and the rotation accuracy; further, the edge computing device determines a difference between the angle sum and the angle difference as the target rotation angle.

For example, following the above-mentioned embodiment, when the initial rotation angle corresponding to the target similarity value is 160 degrees, the angle difference between the initial rotation angle of 160 degrees and the rotation precision of 40 is 120, then the angle sum between the initial rotation angle of 160 degrees and the rotation precision of 40 is 200, and the edge computing device determines the difference of 80 between the angle sum of 200 and the angle difference of 120 as the target rotation angle.

In one embodiment, when the rotation accuracy is greater than or equal to the preset accuracy, the edge computing device generates a target rotation angle according to the initial rotation angle corresponding to the target similarity value and the rotation accuracy, and repeats the rotation operation on the detecting areas based on the target rotation angle. The rotation accuracy can be improved by continuously performing the rotation operation, therefore, making the initial rotation angle corresponding to the rotation accuracy more accurate, making the qualified workpiece to be detected easy to be accurately clamped.

In one embodiment, after identifying whether the detecting workpiece is the qualified workpiece according to the target similarity value and the preset similarity threshold, the method further includes: the edge computing device determines the initial rotation angle corresponding to the target similarity value as a clipping angle, and obtains an internal reference matrix of the photographing device shooting the detecting images; further, the edge computing device calculates a clamping position of clamping the detecting workpiece based on the internal reference matrix and the pixel values of the pixel points of the detecting images; furthermore, the edge computing device controls the clamping device to clamp the detecting workpiece to move the detecting workpiece to a preset area according to the clamping angle and the clamping position.

In one embodiment, the preset area can be set in advance, which is not limited in this application. For example, the preset area can be an area where the qualified workpieces are stored.

Figure 3:
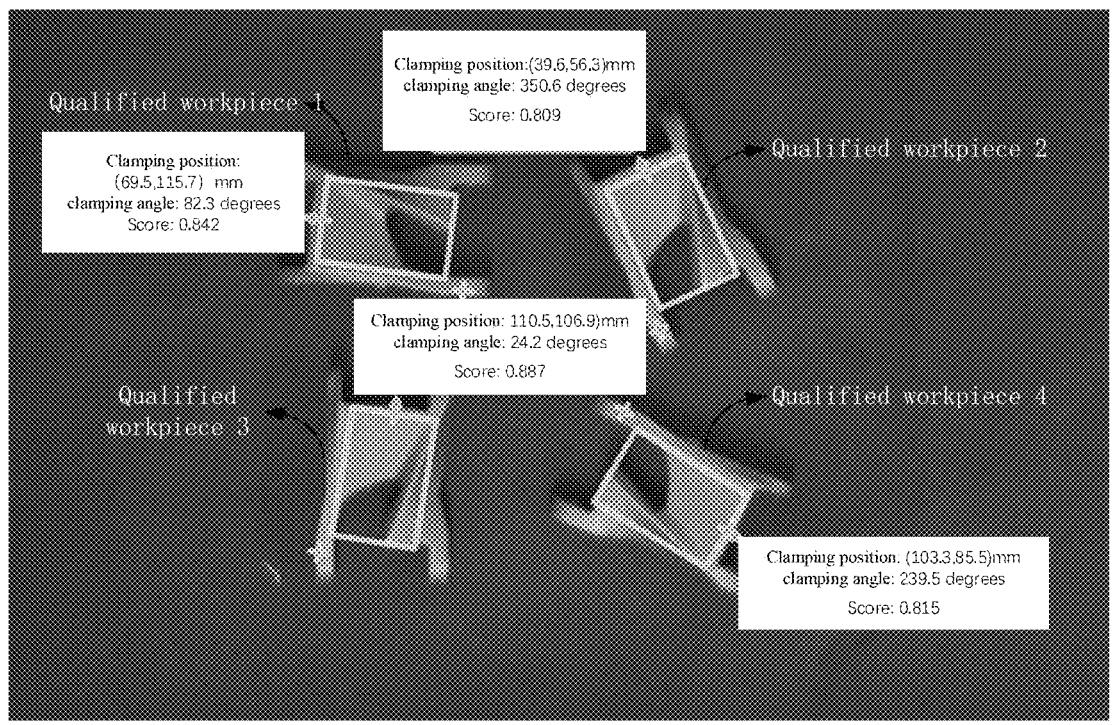
FIG. 3 is a schematic diagram of one embodiment of a detecting workpiece.

FIG. 3 illustrates the detecting workpiece. Four detecting workpieces of FIG. 3 are all qualified workpieces, includes qualified workpiece 1, qualified workpiece 2, qualified workpiece 3 and qualified workpiece 4. In one embodiment, the clamping position of the qualified workpiece 1 is (69.5, 115.7) mm, a clamping angle (arm angle) of the qualified workpiece 1 is 82.3 degrees, and a score of the target similarity score corresponding to the qualified workpiece 1 is 0.842; a clamping position of the qualified workpiece 2 is (39.6, 56.3) mm, a clamping angle (arm angle) of the qualified workpiece 2 is 350.6 degrees, and a score of the target similarity corresponding to the qualified workpiece 2 is 0.809; a clamping position of the qualified workpiece 3 is (110.5, 106.9) mm, a clamping angle (arm angle) of the qualified workpiece 3 is 24.2 degrees, and a score of the target similarity corresponding to the qualified workpiece 3 is 0.887; a clamping position of the qualified workpiece 4 is (103.3, 85.5) mm, a clamping angle (arm angle) of the qualified workpiece 4 is 239.5 degrees, and a score of the target similarity corresponding to the qualified workpiece 4 is 0.815. The edge computing device controls the clamping device to clamp the four qualified workpieces in FIG. 3 to the preset area according to the clamping position and the clamping angle of the qualified workpieces 1, 2, 3, 4.

The present disclosure uses an edge computing device to replace a traditional machine vision industrial personal computer (IPC), since a cost of the edge computing device is lower than that of the machine vision industrial computer, it can reduce the quantity of workpieces, and the cost of detecting the workpieces. By identifying the detecting areas corresponding to the detecting workpiece in the detecting images, the detecting areas that may contain the detecting workpiece in the detecting images can be preliminarily detected; the preset rotation angles are divided to obtain the rotation accuracy and the initial rotation angles, and the division of the preset rotation angle can be flexibly set; the detecting areas are rotated based on each of the initial rotation angles to obtain the rotation area corresponding to each initial rotation angle, the similarity value between each of the rotation areas and the preset qualified area is calculate, and the largest similarity value is determined as the selected target similarity, since the edge computing device includes a multi-core central processing unit, all cores have the same architecture, and in each unit time, the multi-core central processing unit can call multiple threads to handle multiple rotation tasks, therefor increasing the generation speed of the rotation area and the target similarity value. If the rotation accuracy is greater than or equal to the preset accuracy, it is possible to quickly identify whether the detecting workpiece is a qualified workpiece directly according to the comparison result of the target similarity value and the preset similarity threshold, therefore, improving inspection speed of the workpieces. If the rotation accuracy is less than the preset accuracy, the preset rotation angle needs to be updated, and one detecting area is rotated repeatedly based on the target rotation angle, that is, the updated preset rotation angle. The rotation accuracy can be improved by continuously performing the rotation operation, therefore, making the initial rotation angle corresponding to the rotation accuracy more accurate, making the qualified workpiece to be detected easy to be accurately clamped.

Figure 4:
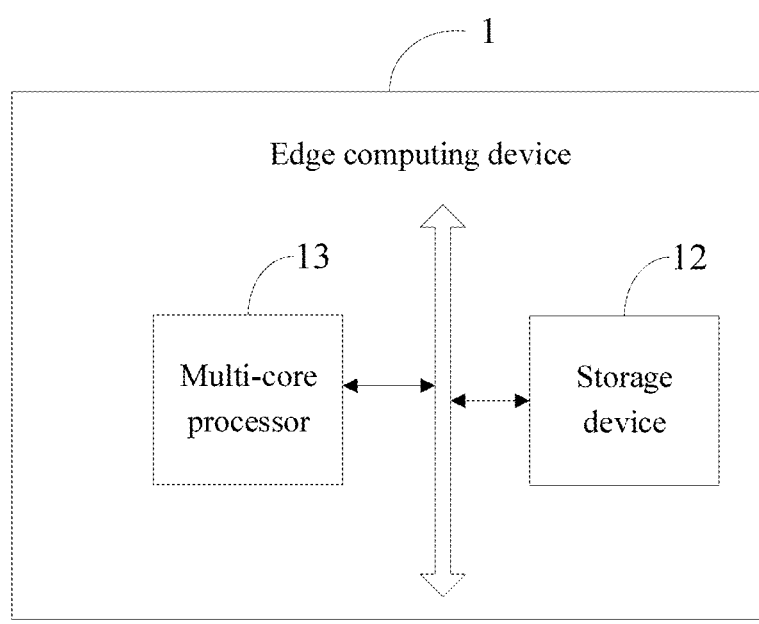
FIG. 4 is a structural diagram of one embodiment of the edge computing device performing the method of FIG. 1.

FIG. 4 illustrates the edge computing device performing the method of FIG. 1. In one embodiment, the edge computing device 1 includes, but is not limited to, a storage device 12, a multi-core processor 13, and a computer program stored in the storage device 12 and executed by the multi-core processor 13. For example, the computer program can be a program of detecting workpieces.

Those skilled in the art can understand that the schematic structural diagram is only an example of the edge computing device 1, and does not constitute a limitation on the edge computing device 1, other examples may include more or less components than the one shown, or combine some components, or have different components, for example, the edge computing device 1 may also include input and output devices, network access devices, buses, and the like.

The multi-core processor 13 may be a central processing unit (CPU), or other general-purpose processors, a digital signal processor (DSP), an application specific integrated circuit (ASIC), Field-Programmable Gate Array (FPGA) or other programmable logic devices, discrete gate or transistor logic devices, discrete hardware components, etc. The general-purpose processor can be a microprocessor or the processor can also be any conventional processor, etc. The multi-core processor 13 is the computing core and control center of the edge computing device 1, and uses various interfaces and lines to connect each part of the e edge computing device 1.

The multi-core processor 13 obtains the operating system of the edge computing device 1 and obtains various installed applications. The multi-core processor 13 obtains the application program to implement each block in the embodiments of the method, for example, to implement each block shown in FIG. 1.

Exemplarily, the computer program can be divided into one or more modules/units, and the one or more modules/units are stored in the storage device 12 and retrieved by the multi-core processor 13 to achieve the application of the method. The one or more modules/units may be a series of computer program instruction segments capable of performing specific functions, and the instruction segments describe the process of acquisition the computer program in the edge computing device 1.

The storage device 12 can be used to store the computer programs and/or modules, and the multi-core processor 13 executes or obtains the computer programs and/or modules stored in the storage device 12, and calls up the data stored in the storage device 12, such that various functions of the electronic device 1 are realized. The storage device 12 may mainly include an area for storing programs and an area for storing data, wherein the area for storing programs may store an operating system, an application program required for at least one function (such as a sound playback function, an image playback function, etc.), and the like; the area for storing data may store the data created in the use of the electronic device 1. In addition, the storage device 12 may include non-volatile storage device such as hard disk, internal memory, plug-in hard disk, smart media card (SMC), Secure digital (SD) card, flash card, at least one disk storage device, flash memory device, or other non-volatile solid state storage device.

The storage device 12 may be an external storage device and/or an internal storage device of the edge computing device 1. Further, the storage device 12 may be a storage in physical form, such as a memory stick, a trans-flash card, and the like.

If the a modules/units integrated in the edge computing device 1 are implemented in the form of software functional units and sold or used as independent products, they may be stored in a computer-readable storage medium. Based on this understanding, the method implements all or part of the processes in the methods of the above embodiments, and can also be completed by instructing the relevant hardware through a computer program. The computer program can be stored in a computer-readable storage medium, and when the computer program is acquired by the processor, the blocks of the method embodiments can be implemented.

The computer program includes computer program code, and the computer program code may be in the form of source code, object code, obtainable file or some intermediate form, and the like. The computer-readable medium may include: any entity or device capable of carrying the computer program code, recording medium, U disk, removable hard disk, magnetic disk, optical disk, computer memory, read-only memory (ROM).

With reference to FIG. 1, the storage device 12 in the electronic device 1 stores a plurality of instructions to implement the method for classifying images, and the multi-core processor 13 can acquire the plurality of instructions to implement: obtaining detecting images of detecting workpieces; identifying detecting areas of the detecting workpieces in the detecting images; performing a rotation operation on the detecting area based on a preset rotation angle to obtain a rotation accuracy corresponding to the preset rotation angle and a target similarity value, including: dividing the preset rotation angle to obtain the rotation accuracy and initial rotation angles; based on each of the initial rotation angles, rotating the detecting area to obtain a rotation area of each of the initial rotation angles; calculating similarity values between each of the rotation areas and a preset qualified area, and determining the largest similarity value as the target similarity value. When the rotation accuracy is greater than or equal to the preset accuracy, the edge computing device identifies whether the detecting workpiece is a qualified workpiece according to the target similarity value and the preset similarity threshold.

Specifically, for the specific implementation method of the above-mentioned instruction by the multi-core processor 13, reference may be made to the description of the relevant blocks in the corresponding embodiment of FIG. 1, and details are not repeated.

In the several embodiments provided in this disclosure, it should be understood that the devices and methods disclosed can be implemented by other means. For example, the device embodiments described above are only schematic. For example, the division of the modules is only by logical function, and can be implemented in another way.

The modules described as separate parts may or may not be physically separate, and the parts displayed as modules may or may not be physical units, that is, may be located in one place, or may be distributed over multiple network units. Part or all of the modules can be selected according to the actual needs to achieve the purpose of this embodiment.

In addition, each functional unit in each embodiment of the present disclosure can be integrated into one processing unit, or can be physically present separately in each unit, or two or more units can be integrated into one unit. The above integrated unit can be implemented in a faun of hardware or in a form of a software functional unit.

The above integrated modules implemented in the form of function modules may be stored in a storage medium. The above function modules may be stored in a storage medium, and include several instructions to enable a computing device (which may be a personal computer, server, or network device, etc.) or processor to execute the method described in the embodiment of the present disclosure.

The present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims. All changes and variations in the meaning and scope of equivalent elements are included in the present disclosure. Any reference sign in the claims should not be construed as limiting the claim. Furthermore, the word "comprising" does not exclude other units nor does the singular exclude the plural. A plurality of units or devices stated in the system claims may also be implemented by one unit or device through software or hardware. Words such as "first" and "second" are used to indicate names but not to signify any particular order.

The above description only represents some embodiments of the present disclosure and is not intended to limit the present disclosure, and various modifications and changes can be made to the present disclosure. Any modifications, equivalent substitutions, improvements, etc. made within the spirit and scope of the present disclosure are intended to be included within the scope of the present disclosure.

What is claimed is:

1. A method for detecting workpiece based on homogeneous multi-core architecture comprising:
   obtaining detecting images of detecting workpieces;

identifying detecting areas of the detecting workpieces in the detecting images;

performing a rotation operation on the detecting areas based on a preset rotation angle to obtain a rotation angle accuracy corresponding to the preset rotation angle and a target image similarity value, comprising:

dividing the preset rotation angle to obtain the rotation angle accuracy and initial rotation angles;

based on each of the initial rotation angles, rotating the detecting areas to obtain a rotation area of each of the initial rotation angles;

calculating image similarity values between each of the rotation areas and a preset qualified area, and determining a largest image similarity value from the image similarity values as the target image similarity value, wherein an image similarity value represents image similarity between the detecting areas and a qualified area, and the rotation angle accuracy represents a ratio of the preset rotation angle to a preset value; and when the rotation angle accuracy is greater than or equal to a preset angle accuracy, identifying whether the detecting workpiece is a qualified workpiece according to the target image similarity value and a preset image similarity threshold.

2. The method as recited in claim 1, wherein identifying the detecting areas of the detecting workpieces in the detecting images comprises:

determining pixel points with greater pixel values than a preset threshold in the detecting images as target pixel points;

determining image areas formed by the target pixel points as feature areas; and determining the detecting areas from the feature areas based on the qualified area;

wherein after identifying whether the detecting workpiece is the qualified workpiece according to the target image similarity value and the preset image similarity threshold, the method further comprises:

determining the initial rotation angle corresponding to the target image similarity value as a clipping angle;

obtaining an internal reference matrix of a photographing device shooting the detecting images;

calculating a clamping position of clamping the detecting workpiece based on the internal reference matrix and pixel values of pixel points of the detecting images;

controlling the clamping device to clamp the detecting workpiece to move the detecting workpiece to a preset area according to the clamping angle and the clamping position.

3. The method as recited in claim 2, wherein determining the detecting areas from the feature areas based on the qualified area comprises:

using an edge detection algorithm to detect edge pixel points of the detecting areas and identifying a contour shape of a contour formed by the edge pixel points as a feature shape of the feature areas, and calculating feature acreage of the feature area;

calculating a shape error between the feature shape and a qualified shape of the qualified area, and calculating an acreage area error between the feature area and the qualified acreage of the qualified area; and determining the feature areas having the shape error within a first preset error range and having the acreage error within a second preset error range as the detecting areas.

4. The method as recited in claim 1, wherein rotating the detecting areas to obtain the rotation area of each of the initial rotation angles based on each of the initial rotation angles, comprises:

constructing threads according to a quantity of cores of a multi-core processor of an edge computing device and a quantity of idle threads, and determining constructed threads and the idle threads as device threads;

generating rotation tasks of the detecting areas according to each of the initial rotation angles and preset instructions, and loading the rotation tasks into a task queue;

dynamically allocating the rotation tasks in the task queue based on a quantity of the device threads, a quantity of the rotation tasks, and status of the device threads to obtain the rotation tasks of each of the device threads; and calling each of the device threads to process corresponding rotation tasks to obtain the rotation area.

5. The method as recited in claim 4, wherein dynamically allocating the rotation tasks in the task queue based on the quantity of the device threads, the quantity of the rotation tasks, and the status of the device threads to obtain the rotation tasks of each of the device threads, comprises:

assigning each of the rotation tasks to one device thread when the quantity of the rotation tasks is less than or equal to the quantity of the device threads; or when the quantity of the rotation tasks is greater than the quantity of the device threads, assigning one rotation task to each of the device threads according to a sequence of the rotation tasks in the task queue, and assigning a next rotation task when one device thread finishes executing current rotation task, until the rotation tasks in the task queue are all assigned.

6. The method as recited in claim 1, wherein identifying whether the detecting workpiece is the qualified workpiece according to the target image similarity value and the preset image similarity threshold, comprises:

comparing the target image similarity value with the preset image similarity threshold;

when the target image similarity value is greater than or equal to the preset image similarity threshold, determining that the detecting workpiece is the qualified workpiece; or when the target image similarity value is less than the preset image similarity threshold, determining that the detecting workpiece is an unqualified workpiece;

determining the initial rotation angle corresponding to the target image similarity value as a clipping angle;

obtaining an internal reference matrix of a photographing device shooting the detecting images;

calculating a clamping position of clamping the detecting workpiece based on the internal reference matrix and pixel values of pixel points of the detecting images;

controlling the clamping device to clamp the detecting workpiece to move the detecting workpiece to a preset area according to the clamping angle and the clamping position.

7. The method as recited in claim 1, wherein when the rotation angle accuracy is less than the preset angle accuracy, the method further comprises:

generating a target rotation angle according to one initial rotation angle corresponding to the target image similarity value and the rotation angle accuracy;

repeatedly rotating the detecting areas based on the target rotation angle, until the rotation angle accuracy is greater than or equal to the preset angle accuracy.

8. The method as recited in claim 1, wherein after identifying whether the detecting workpiece is the qualified workpiece according to the target image similarity value and the preset image similarity threshold, the method further comprises:
  determining the initial rotation angle corresponding to the target image similarity value as a clipping angle;
  obtaining an internal reference matrix of a photographing device shooting the detecting images;
  calculating a clamping position of clamping the detecting workpiece based on the internal reference matrix and pixel values of pixel points of the detecting images;
  controlling the clamping device to clamp the detecting workpiece to move the detecting workpiece to a preset area according to the clamping angle and the clamping position.

9. An edge computing device comprising:
  a processor; and
  a non-transitory storage medium coupled to the processor and configured to store a plurality of instructions, which cause the processor to:
  obtain detecting images of detecting workpieces;
  identify detecting areas of the detecting workpieces in the detecting images;
  perform a rotation operation on the detecting areas based on a preset rotation angle to obtain a rotation angle accuracy corresponding to the preset rotation angle and a target image similarity value, comprising:
    dividing the preset rotation angle to obtain the rotation angle accuracy and initial rotation angles;
    based on each of the initial rotation angles, rotating the detecting areas to obtain a rotation area of each of the initial rotation angles;
    calculating image similarity values between each of the rotation areas and a preset qualified area, and determining a largest image similarity value from the image similarity values as the target image similarity value, wherein an image similarity value represents image similarity between the detecting areas and a qualified area, and the rotation angle accuracy represents a ratio of the preset rotation angle to a preset value; and
  when the rotation angle accuracy is greater than or equal to a preset angle accuracy, identify whether the detecting workpiece is a qualified workpiece according to the target image similarity value and a preset image similarity threshold.

10. The edge computing device as recited in claim 9, wherein the plurality of instructions are further configured to cause the processor to:
  determine pixel points with greater pixel values than a preset threshold in the detecting images as target pixel points;
  determine image areas formed by the target pixel points as feature areas; and
  determine the detecting areas from the feature areas based on the qualified area;
  determine the initial rotation angle corresponding to the target image similarity value as a clipping angle;
  obtain an internal reference matrix of a photographing device shooting the detecting images;
  calculate a clamping position of clamping the detecting workpiece based on the internal reference matrix and pixel values of pixel points of the detecting images;
  control the clamping device to clamp the detecting workpiece to move the detecting workpiece to a preset area according to the clamping angle and the clamping position.

11. The edge computing device as recited in claim 10, wherein the plurality of instructions are further configured to cause the processor to:
  use an edge detection algorithm to detect edge pixel points of the detecting areas and identify a contour shape of a contour formed by the edge pixel points as a feature shape of the feature areas, and calculate feature acreage of the feature area;
  calculate a shape error between the feature shape and a qualified shape of the qualified area, and calculate an acreage area error between the feature area and the qualified acreage of the qualified area; and
  determine the feature areas having the shape error within a first preset error range and having the acreage error within a second preset error range as the detecting areas.

12. The edge computing device as recited in claim 9, wherein the plurality of instructions are further configured to cause the processor to:
  construct threads according to a quantity of cores of a multi-core processor of an edge computing device and a quantity of idle threads, and determine constructed threads and the idle threads as device threads;
  generate rotation tasks of the detecting areas according to each of the initial rotation angles and preset instructions, and load the rotation tasks into a task queue;
  dynamically allocate the rotation tasks in the task queue based on a quantity of the device threads, a quantity of the rotation tasks, and status of the device threads to obtain the rotation tasks of each of the device threads; and
  call each of the device threads to process corresponding rotation tasks to obtain the rotation area.

13. The edge computing device as recited in claim 12, wherein the plurality of instructions are further configured to cause the processor to:
  assign each of the rotation tasks to one device thread when the quantity of the rotation tasks is less than or equal to the quantity of the device threads; or
  when the quantity of the rotation tasks is greater than the quantity of the device threads, assign one rotation task to each of the device threads according to a sequence of the rotation tasks in the task queue, and assign a next rotation task when one device thread finishes executing current rotation task, until the rotation tasks in the task queue are all assigned.

14. The edge computing device as recited in claim 9, wherein the plurality of instructions are further configured to cause the processor to:
  compare the target image similarity value with the preset image similarity threshold;
  when the target image similarity value is greater than or equal to the preset image similarity threshold, determining that the detecting workpiece is the qualified workpiece; or
  when the target image similarity value is less than the preset image similarity threshold, determining that the detecting workpiece is an unqualified workpiece;
  determine the initial rotation angle corresponding to the target image similarity value as a clipping angle;
  obtain an internal reference matrix of a photographing device shooting the detecting images;

calculate a clamping position of clamping the detecting workpiece based on the internal reference matrix and pixel values of pixel points of the detecting images;

control the clamping device to clamp the detecting workpiece to move the detecting workpiece to a preset area according to the clamping angle and the clamping position.

15. The edge computing device as recited in claim 9, wherein the plurality of instructions are further configured to cause the processor to:

generate a target rotation angle according to one initial rotation angle corresponding to the target image similarity value and the rotation angle accuracy;

repeatedly rotate the detecting areas based on the target rotation angle, until the rotation angle accuracy is greater than or equal to the preset angle accuracy.

16. The edge computing device as recited in claim 9, wherein the plurality of instructions are further configured to cause the processor to:

determine the initial rotation angle corresponding to the target image similarity value as a clipping angle;

obtain an internal reference matrix of a photographing device shooting the detecting images;

calculate a clamping position of clamping the detecting workpiece based on the internal reference matrix and pixel values of pixel points of the detecting images;

control the clamping device to clamp the detecting workpiece to move the detecting workpiece to a preset area according to the clamping angle and the clamping position.

17. A non-transitory storage medium having stored thereon instructions that, when executed by at least one processor of an electronic device, causes the least one processor to execute instructions of a method for detecting workpiece based on homogeneous multi-core architecture, the method comprising:

obtaining detecting images of detecting workpieces;

identifying detecting areas of the detecting workpieces in the detecting images;

performing a rotation operation on the detecting areas based on a preset rotation angle to obtain a rotation angle accuracy corresponding to the preset rotation angle and a target image similarity value, comprising:

dividing the preset rotation angle to obtain the rotation angle accuracy and initial rotation angles;

based on each of the initial rotation angles, rotating the detecting areas to obtain a rotation area of each of the initial rotation angles;

calculating image similarity values between each of the rotation areas and a preset qualified area, and determining a largest image similarity value from the image similarity values as the target image similarity value, wherein an image similarity value represents image similarity between the detecting areas and a qualified area, and the rotation angle accuracy represents a ratio of the preset rotation angle to a preset value; and when the rotation angle accuracy is greater than or equal to a preset angle accuracy, identifying whether the detecting workpiece is a qualified workpiece according to the target image similarity value and a preset image similarity threshold.

18. The non-transitory storage medium as recited in claim 17, wherein identifying the detecting areas of the detecting workpieces in the detecting images comprises:

determining pixel points with greater pixel values than a preset threshold in the detecting images as target pixel points;

determining image areas formed by the target pixel points as feature areas; and determining the detecting areas from the feature areas based on a qualified area;

wherein after identifying whether the detecting workpiece is the qualified workpiece according to the target image similarity value and the preset image similarity threshold, the method further comprises:

determining the initial rotation angle corresponding to the target image similarity value as a clipping angle;

obtaining an internal reference matrix of a photographing device shooting the detecting images;

calculating a clamping position of clamping the detecting workpiece based on the internal reference matrix and pixel values of pixel points of the detecting images;

controlling the clamping device to clamp the detecting workpiece to move the detecting workpiece to a preset area according to the clamping angle and the clamping position.

19. The non-transitory storage medium as recited in claim 18, wherein determining the detecting areas from the feature areas based on the qualified area comprises:

using an edge detection algorithm to detect edge pixel points of the detecting areas and identifying a contour shape of a contour formed by the edge pixel points as a feature shape of the feature areas, and calculating feature acreage of the feature area;

calculating a shape error between the feature shape and a qualified shape of the qualified area, and calculating an acreage area error between the feature area and the qualified acreage of the qualified area; and determining the feature areas having the shape error within a first preset error range and having the acreage error within a second preset error range as the detecting areas.

20. The non-transitory storage medium as recited in claim 17, wherein rotating the detecting areas to obtain the rotation area of each of the initial rotation angles based on each of the initial rotation angles, comprises:

constructing threads according to a quantity of cores of a multi-core processor of an edge computing device and a quantity of idle threads, and determining constructed threads and the idle threads as device threads;

generating rotation tasks of the detecting areas according to each of the initial rotation angles and preset instructions, and loading the rotation tasks into a task queue;

dynamically allocating the rotation tasks in the task queue based on a quantity of the device threads, a quantity of the rotation tasks, and status of the device threads to obtain the rotation tasks of each of the device threads; and calling each of the device threads to process corresponding rotation tasks to obtain the rotation area.

* * * * *